May 1, 1956 K. H. HACHMUTH 2,743,996
MULTI-STAGE CRYSTALLIZATION APPARATUS
Original Filed July 11, 1949 2 Sheets-Sheet 1
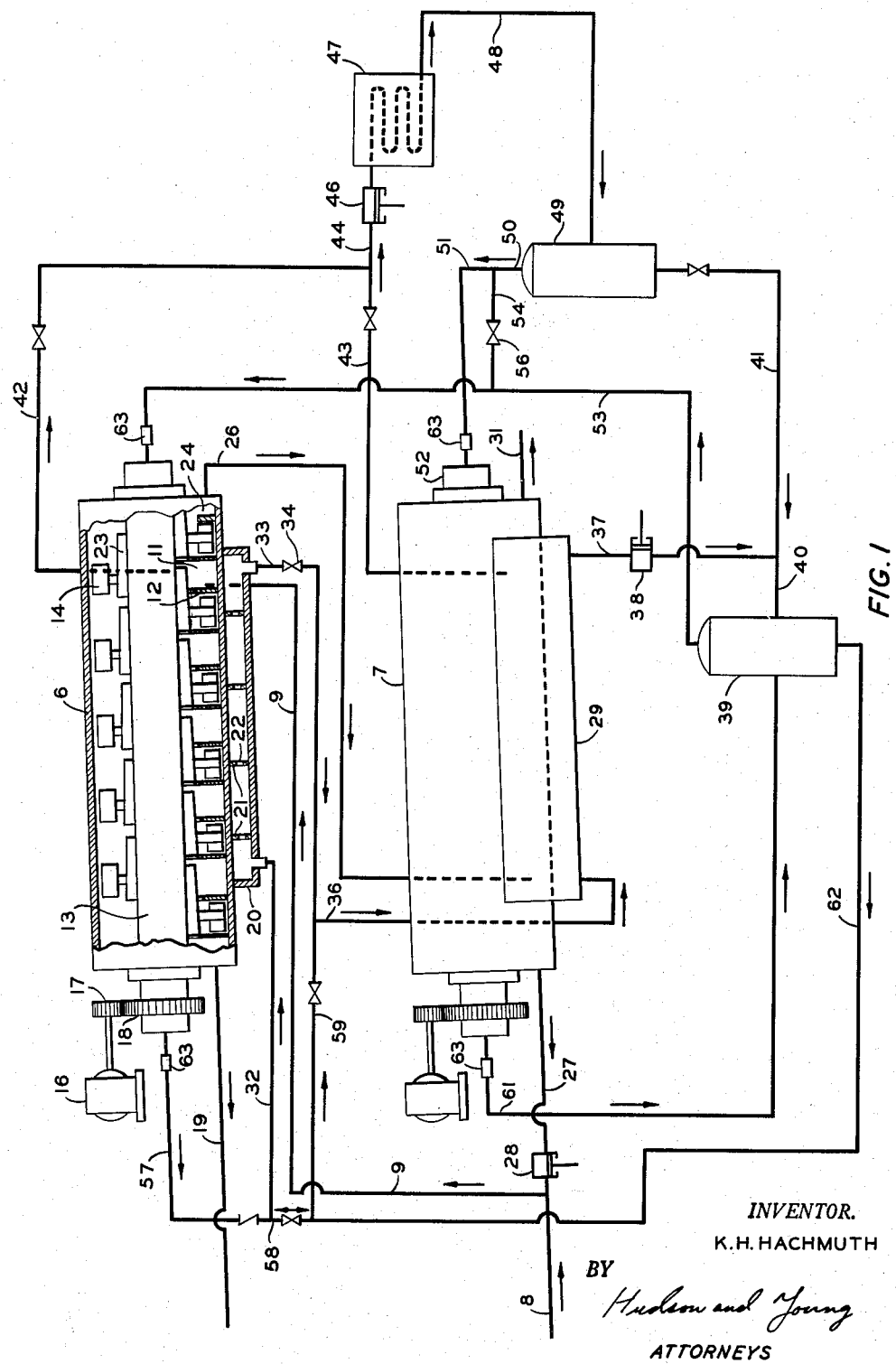
FIG. I
INVENTOR.
K.H. HACHMUTH
BY
*Hudson and Young*
ATTORNEYS May 1, 1956 K. H. HACHMUTH 2,743,996
MULTI-STAGE CRYSTALLIZATION APPARATUS
Original Filed July 11, 1949 2 Sheets-Sheet 2

INVENTOR.
K. H. HACHMUTH
BY
*Hudson and Young*
ATTORNEYS

United States Patent Office 2,743,996
Patented May 1, 1956

2,743,996

MULTI-STAGE CRYSTALLIZATION APPARATUS

Karl H. Hachmuth, Bartlesville, Okla., assignor to Phillips Petroleum Company, a corporation of Delaware Original application July 11, 1949, Serial No. 104,048, now Patent No. 2,593,300, dated April 15, 1952. Divided and this application December 3, 1951, Serial No. 259,657

8 Claims. (Cl. 23—273)

This invention relates to the separation of mixtures of compounds by crystallization. In one of its more specific aspects, it relates to the multistage crystallization of mixtures of compounds. In another specific aspect, it relates to the separation of solid solution-forming mixtures into their components. In another specific aspect, it relates to the purification of compounds by crystallization. In still another specific aspect, it relates to an apparatus for carrying out such separations.

This application is a division of my copending application Serial No. 104,048, filed July 11, 1949, for Multistage Crystallization Process, now Patent Number 2,593,300.

When crystals are frozen from a mother liquor comprising a mixture of compounds which do not form solid solutions, it is theoretically possible to attain pure material by a single crystallization. Actually, the crystals separating from partially frozen mixtures usually give a melt that is far from pure. This is particularly true in the case of hydrocarbons or other organic compounds, and is due to the entrapment of mother liquor by the fine, often fibrous crystals. This mother liquor is held tenaciously and is not easily separated. Pressing, vacuum filtration or centrifuging may remove a portion.

When the components of a mixture form solid solutions, it is not possible either theoretically or actually to obtain a pure material by one crystallization. In such cases, the crystals separating from such a mixture do not have the same composition as the mother liquor. The material crystallized is a mixture of the components present, the ratio depending on the composition of the starting material and on the equilibrium characteristics for the particular system. The crystals will be richer with respect to the higher-melting component of the mixture than the liquid from which those crystals were solidified. A eutectic is considered as being the lower-melting component.

If equilibrium between the crystals separated from a mixture of solid solution-forming components and the remaining liquid could be easily attained, then separation of the components could be obtained by moving the crystals countercurrently to a liquid which becomes increasingly richer with respect to that component tending to be preferentially removed by freezing. The crystals could be melted and a portion of the melt returned countercurrently to the moving crystals while the remainder of the melt would be removed as product. At the opposite end of such a crystallizer, cooling could be applied to generate the crystals. The unfrozen liquid would be removed as the pure, less-easily frozen fraction of the original mixture. The crystals formed would always be moved towards the warmer end of the crystallizer. While such a process is theoretically possible, its efficiency is disappointingly low, because of the time required for the solid and remaining liquid to reach equilibrium.

Resort to alternate partial or complete melting and freezing is usually the result of attempts to obtain pure products by countercurrent continuous crystallization. In such a process, the energy requirements and amount of heat transfer required are inordinately large because the heat of crystallization must be added and removed many times throughout the process.

I have discovered a method by which it is possible to obtain the advantages of alternate melting and freezing without the disadvantages of using large heat exchange surfaces and large heat transfers during the process.

The principal object of my invention is to provide a means of separating mixtures of compounds by crystallization.

Another object is to provide apparatus for removing the excess saturating component from a eutectic-forming mixture.

Still another object is to provide apparatus for separating solid solutions into their components.

Still another object is to provide apparatus for the efficient separation of mixtures into their components by crystallization methods.

Other objects and advantages of the invention will be apparent from the following description, drawings, and disclosure.

In the drawings:

Figure 1 is a part cross-sectional, part elevational view showing my apparatus.

Figure 3:
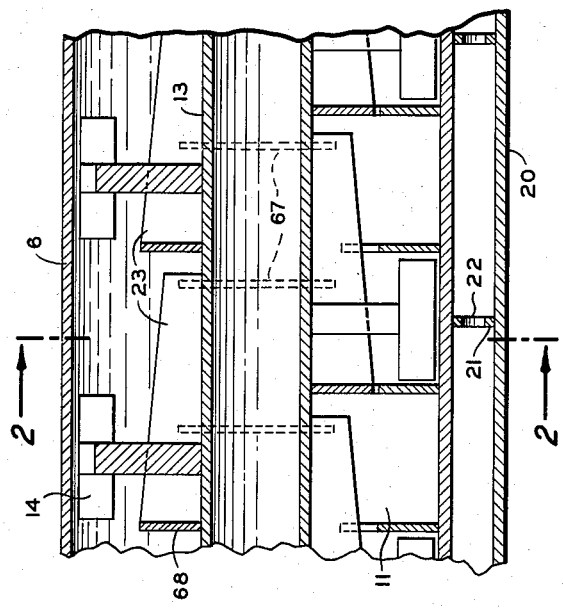
Figure 3 is a portion of a longitudinal cross-sectional view of the crystallization chamber taken along plane 3—3 of Figure 2.

In Figure 1, an inclined crystallization chamber 6 is shown positioned above a similar chamber 7. A feed mixture enters the system through lines 8 and 9. Line 9 enters crystallization chamber 6 at transverse trough 11. The lower portion of the inclined crystallization chamber is divided into segments by a series of transverse baffles 12. Rotatably and coaxially mounted within said crystallization chamber 6 is a smaller cylinder 13. A plurality of scraper paddles 14 extend radially outward from rotatable cylinder 13 and correspond to the troughs formed by said transverse baffles so that when the smaller cylinder is rotated, the paddles scrape the bottoms of the respective troughs. Motor 16 rotates cylinder 13 by means of gears 17 and 18. Product take off line 19 leads from the last compartment on the low end of crystallization chamber 6 for removing the lower-melting fraction produced by the separation.

Surrounding the bottom portion of the inclined crystallization chamber 6 is a cooling jacket 20. This jacket is divided internally into compartments by a series of baffles 21 having openings 22 therethrough.

The feed mixture, as it enters compartment 11 of the crystallization chamber 6, is partially cooled by the abstraction of heat by means of refrigerant flowing through cooling jacket 20 so that at least a portion of the mixture is crystallized. The crystallized material is scraped from the trough by means of the corresponding rotating paddle. As the frozen material is transported towards the top of the crystallization chamber by the continued rotation of cylinder, said crystallized material falls over the inner edge of the paddle onto rotatable cylinder 13, which is maintained at a temperature sufficiently high to melt the frozen material. The melted material flows from longitudinal trough 23 at its open end, which is towards the higher end of the crystallization chamber 6 and falls into the transverse trough next adjacent on the high side of the trough from which it was removed. The uncrystallized material displaced by the addition of the melt to a transverse trough overflows the baffle on the low side of said trough into the next adjacent trough on the low side. The last transverse trough or compartment 24 on the high end of crystallization chamber 6 does not have a paddle for scraping solid material and is not cooled by the jacket since it is contemplated that all material entering said compartment 24 will leave the crystallization chamber through outlet line 26 which leads to the lower portion of the jacketed compartment of a similar crystallization chamber 7. The product outlet line 27 from the low side of crystallization chamber 7 leads to pump 28 and thence into line 9 which leads to chamber 6 as previously described. Crystallization chamber 7 has a cooling jacket 29 surrounding a lower portion. Product outlet line 31, leading from the last compartment on the high end of chamber 7, is the outlet line for the higher-melting fraction produced by the separation and leads to an external storage, not shown.

The refrigerant or heat transfer liquid moves through the apparatus in a closed system. Beginning with line 32, the refrigerant liquid flows therethrough into cooling jacket 20 of crystallization chamber 6 at the low end of said chamber. The refrigerant leaves jacket 20 through line 33 and valve 34 and enters jacket 29 of crystallization chamber 7 via line 36. Refrigerant outlet line 37 from jacket 29 leads to pump 38, thence into separator 39 via line 40.

The gaseous refrigerant which results from the evaporation of the liquid refrigerant in jackets 20 and 29 leaves via lines 42 and 43, respectively, which join to form line 44. Refrigerant compressor 46 is interposed in line 44 ahead of cooler 47. Cooler 47 has an outlet line 48 which leads to a second separator 49. The liquid refrigerant leaves the bottom of said second separator 49 via lines 41 and 40 which lead to the previously described separator 39. The uncondensed refrigerant leaves an upper portion of separator 49 through line 51 and at least a portion enters rotatable cylinder 52 of crystallization chamber 7. The gaseous portion of the refrigerant from separator 39 leaves an upper portion of said separator via line 53 which leads to rotatable cylinder 13 of crystallization chamber 6. As desired, a portion of the gaseous refrigerant leaving separator 49 through line 50 may be passed into line 53 via line 54 controlled by valve 56 or via line 51 into central cylinder 52. The liquefied refrigerant leaving rotatable cylinder 13 at its low end is passed through line 57 to cooling jacket 20 via line 32 or, as desired, a portion may be caused to flow through line 58, line 59 and line 36 into jacket 29. The liquefied and gaseous refrigerant from rotatable cylinder 52 of crystallization chamber 7 leaves said cylinder via line 61 which leads to separator 39. The liquid refrigerant leaves the lower portion of said separator 39 via line 62 and as desired may flow through line 59 to ultimately reach jacket 29 or through line 58 into jacket 20 via line 32. Sealing glands 63 are provided in the lines joining the rotatable cylinders.

Figure 2:
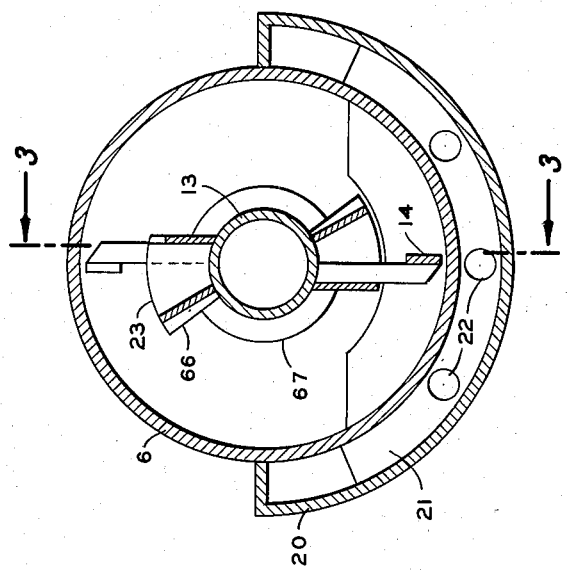
Figure 2 is a transverse cross-sectional view of the crystallization chamber taken along the plane 2—2 of Figure 3.

In Figure 2, the crystallization chamber 6 is shown as having on its under side a cooling jacket 20 having baffle 21 with openings 22 therethrough. Paddle 14 scrapes through the transverse trough formed by transverse baffles 12. Each of the rotating paddles has a corresponding melting trough 23 which extends longitudinally along rotatable cylinder 13 for a distance less than twice the width of the transverse troughs. Longitudinal trough 23 is closed on the end towards the low side of the crystallization chamber and is open at the end towards the high side of the crystallization chamber. At least one of the walls 66 of said trough 23 follows a spiral course along the rotatable cylinder so that liquid in said trough will flow towards the high side of the crystallization chamber. This is necessary because the apparatus is inclined upward towards the open end of said longitudinal troughs 23. Drip guide 67, which is a disc surrounding the rotatable cylinder 13 at a point just short of the end of trough 23 prevents liquid from flowing along rotatable cylinder 13 toward the lower end of the apparatus.

In Figure 3, the longitudinal troughs 23 along rotatable cylinder 13 are more clearly shown. Each trough has an end closure 68 at the lower end and is open at the opposite end. The position of drip guide 67 is more clearly shown in this figure. The liquid formed by melting solid material which has been scooped from transverse compartment 11 by scraper 14 pours from trough 23 into the high side of the next adjacent transverse compartment towards the higher end of the apparatus. In the drawings, this is the next trough to the right.

Operation

My apparatus and process are particularly efficient in the separation of binary mixtures of compounds into higher-melting and lower-melting fractions. The higher-melting fraction is either the higher-melting component or the saturating component in substantially pure form. With solid solution-forming mixtures that do not form eutectics, the lower-melting fraction is the lower-melting component in substantially pure form and complete separation can be made by crystallization. The case of eutectic-forming mixtures, the higher-melting fraction is the saturating component of the mixture in substantially pure form while the lower-melting fraction is substantially pure eutectic. Sometimes, solid solutions are formed by the saturating component and the eutectic. The saturating component is the higher-melting fraction and the eutectic is the lower-melting fraction. Eutectic mixtures may be resolved into their components by adsorption, extractive distillation, azeotropic distillation, solvent extraction, chemical means, or other applicable means. I can also separate mixtures containing more than two components. However, each unit can separate the mixture into only two fractions. Those fractions which contain more than one component may be separated in another unit or stored and passed through the original unit after the first separation is complete.

The operation will be more clearly understood from the following description of a separation. The feed material which is to be separated into two fractions enters the upper crystallization chamber near the warmer end of said chamber. In the drawing, I have shown the feed as entering the second transverse trough from the warmer end. This feed is cooled by the refrigerant circulating through the jacket surrounding the lower portion of said chamber so that a portion of the feed mixture is frozen or crystallized on the vessel wall. The scrapers 14 rotating with the central cylinder 13, periodically passes through this trough and scrape the accumulated crystals from the stationary cylinder wall. On continued rotation of the central cylinder, the crystals on the scrapers are elevated until they slide off the scrapers onto the central cylinder. The trough on said central cylinder surrounding the base of each scraper retains the material that falls from said scraper. This material is melted by contact with the relatively warm central cylinder and the melt flows through said trough towards the warmer end of the crystallization chamber and pours into the transverse trough next adjacent towards the warmer end of the apparatus. The melted material is added to the transverse trough at a point near the high side of said trough to permit thorough mixing of the melt with the contents of said transverse trough. The adidtion of the melt displaces an equivalent volume of the liquid already present in the trough. Since the crystallization chamber is inclined upward from the cooler end, the displaced liquid in each trough always flows toward the cooler end of the apparatus. When the liquid reaches the cooler end of the apparatus, the separation is substantially complete and the lower-melting fraction is removed from the cooler end of the crystallization chamber. Eventually, the higher-melting material reaches the last transverse trough on the warmer end of the apparatus and is removed therefrom.

The higher-melting fraction from the first crystallization chamber is transferred to a second similar crystallization chamber and is introduced at a point near the cooler end of said second chamber. Material which crystallizes from this material as it enters the second chamber is removed from contact with the liquid and is remelted by contact with the relatively warm central cylinder. The melt from each portion of the crystallized material is moved to the next adjacent transverse trough on the warmer side. Eventually, a portion of the original feed mixture reaches the warmer end of said second crystallization chamber. This material comprises one of the components in substantially pure form. If the feed mixture is a solid solution-forming mixture, the higher-melting fraction will be the higher-melting component. If the feed mixture is a eutectic-forming mixture, the higher-melting fraction will be the saturating component of said mixture.

The temperature at the cooler end of the apparatus must be close enough to the melting point of the lower-melting fraction to be removed so that said fraction will be completely liquid if it contains less than a predetermined amount of the higher-melting fraction. If more than said amount is present, a portion should freeze. The temperature at the warmer end should be about the melting point of the higher-melting fraction.

In each transverse trough of each chamber, with the exception of the end trough, the action is the same. The liquid therein is cooled to crystallize a portion of the crystallizable material. This crystallized material is then removed from contact with the liquid and is transferred toward the warmer end of the apparatus, thereby displacing an equal volume of the remaining liquid towards the cooler end of the apparatus.

My apparatus, with the series of transverse troughs, provides a means for maintaining a composition gradient throughout the system. Melting and recrystallization occurs in each of said troughs and the liquid added to each trough is always richer with respect to the higher-melting fraction than the liquid which it displaces. Without a positive means for maintaining separate portions of the liquid throughout the system, it is almost impossible to maintain a composition gradient, since liquids in contact with each other are easily mixed by a small amount of agitation.

While I have shown two separation crystallization chambers, I can use only one such chamber. The use of a single chamber apparatus would simplify the construction but the proper temperature and enthalpy relationships would be more difficult to maintain in a single chamber apparatus. A two chamber apparatus is the preferred modification of my invention.

In order to provide the proper cooling and heating for efficient operation, a mixed refrigerant is preferred. This is a refrigerant consisting of two or more compounds which have different volatilities. Such a mixed refrigerant will evaporate over a temperature range and furnish refrigeration at different temperature levels without the use of complicated equipment. Conversely, condensation of such a mixed refrigerant furnishes heat at different temperature levels.

It is evident that I wish to remove heat over a considerable temperature range and to simultaneously supply heat over another temperature range. For best operation, the amount of heat removed in each transverse trough (except for the terminal troughs) should be very nearly the same. The amount of heat supplied to melt the crystals from each scraper should be approximately the same as that removed in each corresponding trough. This means that the temperature difference between the central tube and the outer cylinder must be rather constant throughout the equipment. This condition can be approached quite closely by suitable choice of refrigerant mixtures and by a refrigerant flow system such as that illustrated in Figure 1.

Starting with conduit 32, liquid refrigerant enters the refrigerated jacket of the upper vessel at the coldest point in the system. The refrigerant flows to the right through the jacket continually rising in temperature as it is boiled away in refrigerating the stationary cylinder. Any liquid refrigerant remaining at the right end of the jacket is removed through conduit 33, receives additional refrigerant through line 59 if needed, and passes by conduit 36 to the left hand end of the refrigerated jacket 29 of the lower chamber. The refrigerant passes to the right through this jacket continually rising in temperature as it is boiled away. Any unvaporized refrigerant is removed through conduit 37 and pumped through conduit 40 into the lower separator 39.

The vapors evolved in the refrigerated jackets 20 and 29 are collected by conduits 42 and 43 and passed through conduit 44 to a compressor 46 where the pressure is increased to the level required by the heating tubes. The compressor discharges to a cooler 47 where the vapor is cooled and may be partly condensed. The cooled fluid flows through conduit 48 to a separator 49 where the liquid is separated and removed through conduit 41 thence passing through conduit 40 to the lower separator. Vapor leaving the upper separator 49 passes through conduits 50 and 51 into the central heater tube of the lower vessel. Here the vapor is partly condensed at it passes down the tube, and drops in temperature as it is condensed. The mixed vapor and liquid passes through conduit 61 to the lower separator where the residual vapor is removed through conduit 53. This residual vapor plus additional vapor from conduit 54, if needed, passes to the heating tube 13 in the upper vessel. Here it is completely or partially condensed and drops in temperature as it condenses. The resultant condensate and residual vapor (a separator might, if desired, be provided at this point to separate the residual vapor) leaves the tube by conduit 57 and all or part enters conduit 32 thereby completing the circuit. Conduit 58 serves to remove unwanted refrigerant or add more refrigerant to 32 if needed.

By a proper choice of refrigerating mixtures and pressure levels for various parts of the equipment, almost any temperature enthalpy relationship can be obtained. A relatively non-volatile liquid may be used in the mixture so that some residual liquid always remains. This would cause a large temperature rise at the hot end of the refrigerating jackets with little heat transfer. Inclusion of a relatively non-condensible vapor would give large temperature drops at the cold end with little heat transfer. Inclusion of two components forming non-ideal solutions will give flat temperature curves in the middle of the apparatus. Inclusion of immiscible compounds will give other special effects. The variations obtainable are almost without limit and the specific requirements will determine the refrigerant makeup. However, it is well within the skill of any good engineer to determine the specific requirements.

The central heating tubes can be equipped with spiral elevating screws in their interior so that the condensate can be removed at their upper ends, thereby obtaining another type of temperature curve and, in case the vapor is completely condensed, eliminating the necessity of one or two packing glands. Even if the vapor is not completely condensed, provision of a central eduction tube will permit elimination of the lower packing glands.

At the loss of some flexibility, the upper and lower vessels can be joined end to end for forming a single unit. Piping would be greatly simplified but it would be more difficult to obtain proper temperature enthalpy relationships.

This equipment is very efficient energy-wise because it is necessary to pump heat only between the cooling and heating levels, not from the cooling level to cooling water temperatures. At low temperatures, heat exchange between the stream in conduit 44 and stream 48 or its equivalent should be provided. Also, the feed in all cases should be cooled by an auxiliary cooler to operating temperature before entering the equipment. The liquid feed should be cooled to the temperature just above that at which the first solid begins to form.

Instead of adding the melted material back to the next adjacent transverse trough on the warmer side, it may be added back to the second or even third trough. In such a case, the troughs and paddles on the central rotatable cylinder would be spaced at 120° or 90° intervals and the troughs would be extended a distance slightly less than three or less than four transverse troughs.

The last transverse baffle on the warm end of the crystallization chambers is lower than the other baffles so that liquid overflows into the last trough on the warm side from the next lower trough. This prevents freezing in the outlet trough.

It is evident that my invention is useful in the separation of mixtures of compounds which melt over a range of temperatures. These mixtures can be separated into lower-melting fractions and higher-melting fractions. While my invention is particularly useful in separating binary mixtures of solid solution-forming components into the pure components and for removing the excess saturating component from eutectic-forming mixtures, it is not limited to these types of separation but is useful in separating any mixture which can be separated by crystallization methods. My invention is not limited to the use of any particular feed mixture or any particular mixture of refrigerating liquids but is limited only by the following claims.

Having described my invention, I claim:

1. A continuous multi-stage crystallizer which comprises an inclined, elongated stationary cylindrical chamber, said chamber having a series of baffles positioned transversely across the bottom thereby forming a series of transverse troughs, a rotatable cylinder of smaller diameter than said chamber axially positioned within said chamber, a plurality of paddles secured to and extending radially outward from said rotatable cylinder to the wall of said chamber, a cooling jacket surrounding a lower portion of said chamber, a series of longitudinal troughs on said rotatable cylinder formed by vanes extending radially outward from and axially along said rotatable cylinder for a distance greater than the width of said transverse troughs, said longitudinal troughs having an opening in the end nearest the higher end of said apparatus, a product outlet in the lower end of said chamber for removing a lower-melting fraction, a product outlet in the higher end of said chamber for removing a higher-melting fraction, a feed inlet in said chamber intermediate the ends thereof, and means for heating the rotatable cylinder.

2. The crystallizer of claim 1 in which a refrigerant consisting of at least two compounds which have different volatilities circulates in said cooling jacket.

3. A continuous multi-stage crystallizer which comprises, an inclined cylindrical chamber having a plurality of dividing baffles transversely positioned across the lower peripheral portion, thereby dividing the lower portion of said chamber into a series of compartments, a rotatable cylinder of smaller diameter than said chamber coaxially positioned within said chamber, a plurality of paddles extending radially outward from said rotatable cylinder to the wall of said chamber, each paddle being adapted to scrape the arcuate bottom of the corresponding transverse trough on being rotated, a plurality of horizontal troughs on said rotatable cylinder, each paddle having a corresponding trough surrounding its base and extending longitudinally along said cylinder from a point parallel with the low side of the transverse trough through which the paddle passes to a point just short of the high side of the transverse trough to which the melt is to be added, a cooling jacket surrounding the lower portion of said cylindrical chamber, means for circulating a cooling fluid through said jacket, means for heating said rotatable cylinder, a product outlet in each of the ends of said chamber, and a feed inlet in said chamber at a point intermediate the ends thereof.

4. A continuous multi-stage crystallizer which comprises, a first separation zone comprising an inclined cylindrical chamber having a plurality of baffles positioned transversely and horizontally across the lower peripheral portion of said chamber, a rotatable cylinder of smaller diameter than said chamber coaxially positioned within said chamber, a plurality of paddles extending radially outward from said rotatable cylinder to the wall of said chamber, said paddles being adapted to scrape the arcuate bottoms of the corresponding transverse troughs on being rotated, a plurality of horizontal troughs on said rotatable cylinder, each paddle having a corresponding horizontal trough surrounding its base and extending longitudinally along said cylinder from a point opposite the low side of the transverse trough through which the paddle passes to a point just short of the high side of the next higher transverse trough, the sides of said longitudinal trough following a generally helical course around said rotatable cylinder so that the sides slope downward towards the higher end of said cylindrical chamber, a cooling jacket surrounding the bottom portion of said cylindrical chamber, means for circulating a cooling fluid through said jacket, means for heating said rotatable cylinder, a product outlet in the low end of said chamber, a feed inlet for introducing feed material into said first chamber at a point adjacent the highest transverse trough, a second operation zone similar to said first zone, means for transferring material from the high end of said first zone to the low end of said second zone at a point adjacent the lowest transverse trough, means for transferring the material from the lowest transverse trough of said second separation zone to said first zone through the feed inlet thereof, means for cooling the lower portion of said second zone, means for heating the rotatable cylinder of said second zone, and means for removing the product from the higher end of said second zone.

5. In a multi-stage crystallization apparatus of the type described having a first and a second crystallization zone, an improved cooling and melting system which comprises, in combination, a first cooling jacket on the lower peripheral portion of said first zone, a first melting tube rotatably mounted within said first zone, a second cooling jacket on the lower peripheral portion of said second zone, a second melting tube rotatably mounted within said second zone, a conduit for transferring the liquid refrigerant from the warmer end of said first jacket to the cooler end of said second jacket, a gas compressor, a conduit for transferring the vaporous refrigerant from said first and second cooling jackets to said compressor, a refrigerant cooler, a first separator, a conduit for passing the compressed refrigerant from said compressor through said cooler into said first separator, a conduit for removing the vaporous refrigerant from said first separator and transferring it to the rotatable tube of said second separation zone, a second separator, a conduit for transferring liquid refrigerant from said first separator to said second separator, a conduit for passing the liquid refrigerant from said second cooling jacket to said second separator, a pump interposed in said line between said second jacket and said second separator, a conduit for transferring the effluent from said second rotatable tube to said second separator, a conduit for transferring the vaporous refrigerant from said second separator to said first rotatable tube, a valve-controlled by-pass conduit connecting said conduit leading from said second separator to said first rotatable tube with said conduit leading from said first separator to said second rotatable tube, a refrigerant conduit leading from the bottom of said second separator to said conduit connecting the outlet of said first cooling jacket and the inlet of said second cooling jacket, a conduit leading from the outlet of said first rotatable tube to the inlet of said first cooling jacket, and a valve-controlled by-pass conduit between the conduit leading from the bottom of said second separator and the conduit leading from said first rotatable tube.

6. A continuous multi-stage crystallizer which comprises an inclined, elongated stationary chamber, said chamber having a series of baffles positioned transversely across the bottom, thereby forming a series of transverse troughs, a rotatable cylinder of smaller diameter than said chamber positioned within said chamber, a plurality of lift members secured to and extending radially outward from said rotatable cylinder and into said transverse troughs, a cooling jacket in heat exchange with said chamber, a series of longitudinal troughs on said rotatable cylinder formed by vanes extending radially outwardly from and axially along said rotatable cylinder for a distance greater than the width of said transverse troughs, said longitudinal troughs having an opening in the end nearest the higher end of said apparatus, a product outlet in the lower end portion of said chamber for removing a lower melting fraction, a product outlet in the higher end portion of said chamber for removing a higher melting fraction, a feed inlet communicating with said chamber, and means for heating the rotatable cylinder.

7. The crystallizer of claim 6 in which a refrigerant consisting of at least two compounds which have different volatilities circulates in said cooling jacket.

8. A continuous multi-stage crystallizer which comprises an elongated chamber laterally disposed with respect to the vertical, means to maintain a temperature differential throughout said chamber, thereby forming a warm end and a cold end; a plurality of baffles in said chamber, transverse to the longitudinal axis thereof, forming a series of troughs therein, and for each said trough the top of the baffle on the warm end side being higher than the top of the baffle on the cold end side; means within said chamber for melting solid material; means for conveying solid material from each said trough into heat exchange with said means for melting; means for introducing said melted material into the next adjacent trough toward the warmer end of said chamber; a product outlet extending from the cooler end of said chamber for removing a lower-melting fraction; a product outlet in the warmer end of said chamber for removing a higher-melting fraction; and a feed conduit communicating with said chamber.

References Cited in the file of this patent
UNITED STATES PATENTS

| | | |
|---|---|---|
| 900,892 | Stanley | Oct. 13, 1908 |
| 1,004,858 | Don | Oct. 3, 1911 |
| 1,116,903 | McClintock | Nov. 10, 1914 |
| 1,810,217 | Lohmann | June 16, 1931 |
| 1,906,534 | Burke | May 2, 1933 |
| 1,975,704 | Wilkes | July 28, 1933 |
| 2,174,302 | Whitney | Sept. 26, 1939 |
| 2,552,524 | Cunningham | May 15, 1951 |
| 2,562,651 | Whitney | July 31, 1951 |